Patented June 26, 1951

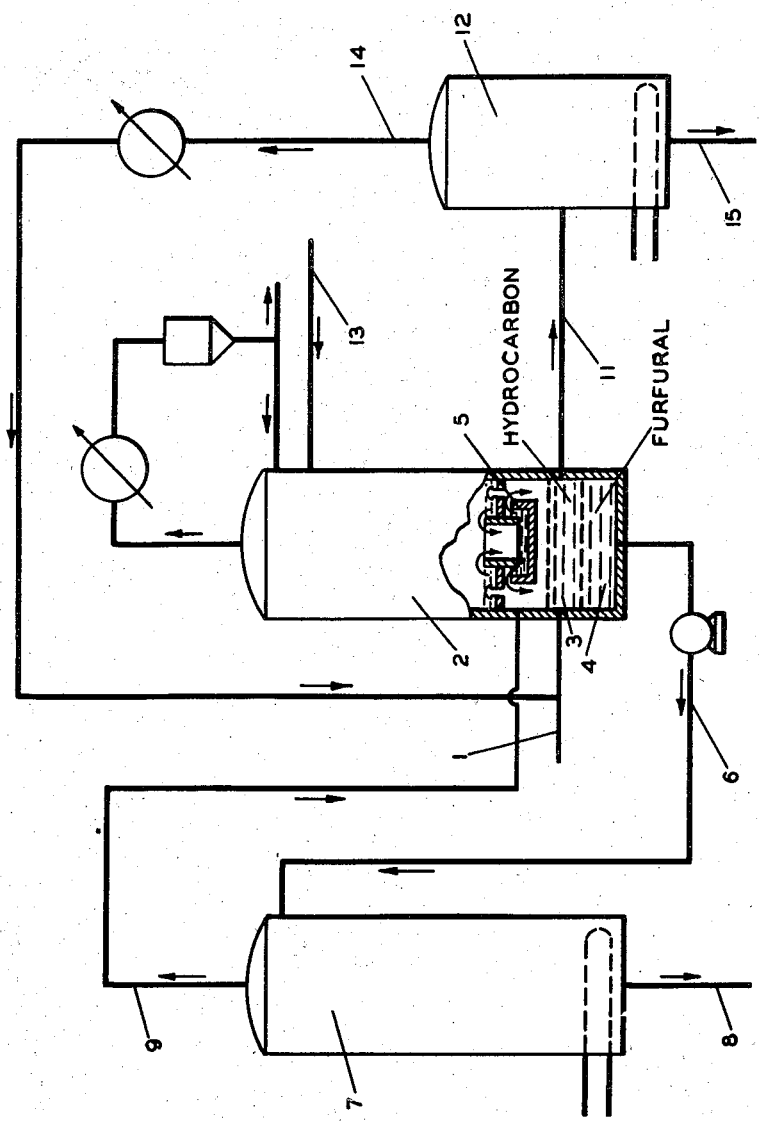

2,558,587

UNITED STATES PATENT OFFICE 2,558,587

FOAM PREVENTION IN EXTRACTIVE DISTILLATION OF HYDROCARBONS

Douglas S. Sherwin, Bartlesville, Okla., assignor to Phillips Petroleum Company, a corporation of Delaware Application March 10, 1947, Serial No. 733,695

7 Claims. (Cl. 202—39.5)

This invention relates to improved methods for purifying furfural used as selective solvent in the extractive distillation of hydrocarbons. In one particular aspect it relates to improvements in processes for the extractive distillation of a mixed hydrocarbon stream with furfural as selective solvent for at least one hydrocarbon contained in such stream.

In the extractive distillation of hydrocarbon streams with furfural as selective solvent, and especially in extractive distillation to recover normal butene and/or butadiene from $C_4$ hydrocarbon streams containing the same in the manner disclosed in the copending applications of Hachmuth, Serial No. 438,844, filed April 13, 1942, and now Patent 2,434,796, issued January 20, 1948, and Serial No. 454,312, filed August 10, 1942, now Patent 2,415,006, issued January 28, 1947 the furfural solvent gradually becomes contaminated with foam producing impurities or with polymer formers and polymerization accelerators which are picked up or formed from the hydrocarbon stream being extracted. While the exact nature of these materials is not known with certainty, they may include heavy hydrocarbons, esters or related compounds.

Furfural in such extractive distillation is ordinarily rerun by steam distillation at intervals for the removal of polymer, in accordance with U. S. Patents 2,350,584 and 2,350,609. Such rerunning, however, does not effect the removal of foam producing substances, polymer formers and/or polymerization accelerators. Presumably this is because these impurities boil below or approximately at the boiling point of furfural or of furfural containing the limited amount of water commonly employed. When the concentration of foam producing substances exceeds certain limits the furfural foams excessively in the extractive distillation and solvent stripping steps. This results in inefficient extraction and carry-over of solvent into the hydrocarbon products of these steps. Accumulation of polymer forming and/or polymerization accelerating materials in such furfural also occurs.

It is an object of the present invention to provide an improved method for removing impurities from such furfural in a simple and economically feasible manner.

Another object is to provide a method for such removal of impurities which requires a minimum of equipment and additional processing steps.

Another object is to provide such a method wherein impurities are extracted from furfural flowing through an extractive distillation step without interfering with the passage of furfural through said step.

Other objects and advantages will become apparent to those skilled in the art as this disclosure proceeds.

The accompanying drawing shows diagrammatically one arrangement of equipment which has been found to be satisfactory for carrying out the present invention but my invention is not limited to the type of equipment shown therein.

In accordance with my invention furfural which is contaminated with impurities is subjected to liquid-liquid extraction in an extractive distillation column with a mixture of hydrocarbons used as feed to said column.

In the present state of the art it is not necessary to give a detailed description of extractive distillation with furfural. It will be sufficient to state that such an extractive distillation system comprises an extractive distillation column similar to an ordinary fractional distillation column. Furfural, usually containing a minor proportion of water, is fed into the top of this column and descends countercurrently to light hydrocarbons being extracted and fractionated. Furfural, rich in selectively absorbed hydrocarbon is withdrawn from the bottom of the extractive distillation column and is fed into a stripping column where the absorbed hydrocarbon is driven off from the furfural. Such a process is described in detail in the copending application of Hachmuth Serial No. 482,435, filed April 9, 1943, now Patent 2,411,785, issued November 26, 1946.

Construction and operation costs frequently make it desirable to construct the extractive distillation portion of the system as two shorter columns operated in series, rather than as a single tall column. When a single tall column is used it is customary to introduce the hydrocarbon feed at an intermediate point in the column, or, when two shorter columns are used, to introduce the feed near the bottom of that section which is equivalent to the upper portion of a single column. All of the authorities are not in agreement as to whether or not the formation of two liquid phases (selective solvent and hydrocarbon) in an extractive distillation process is deleterious to the operation. In some cases, two liquid phases may actually be present while in other cases the conditions are such that two liquid phases would be expected and yet it appears that an emulsion is formed which behaves in a manner similar to a single liquid phase. The existence of two liquid phases is dependent upon among other things the composition of the hydrocarbon feed, the ratio of the selective solvent to the feed, the temperature of the hydrocarbon feed stream, the pressure on the system and the degree to which equilibrium is attained between the hydrocarbon feed and the solvent.

In accordance with my invention, conditions are so maintained that two liquid phases do exist in that portion of the column just below the point of introduction of the feed. It is immaterial whether or not the two liquid phases are in equilibrium just so long as a liquid hydrocarbon phase is present and floats upon the surface of a furfural phase.

Furfural containing dissolved unsaturates in descending the column must pass through the liquid hydrocarbon layer and is there subjected to liquid-liquid extraction. I have found that a sufficient proportion of foam producing substances are extracted from the furfural by passing through such hydrocarbon layer to reduce their concentration in the furfural and thereby to reduce foaming, and that polymer forming and/or polymerization accelerating substances are also extracted from the furfural.

I have found that removal of sufficient foam producing substances from the system to reduce foaming may be accomplished by subjecting a portion of the hydrocarbon feed layer to continuous withdrawal. The withdrawn portion may be subjected to distillation to recover purified hydrocarbons as an overhead product and a kettle product containing the impurities. The hydrocarbons may then be returned to the extractive distillation system.

In the accompanying drawing an extractive distillation column which is operated in accordance with my invention is illustrated. A hydrocarbon feed stream containing at least one hydrocarbon selectively absorbed by furfural enters near the bottom of extractive distillation column 2 via line 1. Furfural enters column 2 via line 13, and descends in liquid phase in countercurrent to rising vapors of hydrocarbons.

The feed entering via line 1 is so controlled as to temperature and rate of flow that it is not all volatilized at once but forms a hydrocarbon layer 3 floating on the surface of a layer of furfural containing dissolved hydrocarbon 4 in the bottom of column 2. To obtain this result it is best to introduce the feed stream at a temperature at which not more than about 20 per cent of the feed is vaporized at the pressure of operation. The feed although preheated to a temperature at which about 20 per cent of it would be volatilized at the pressure at which column 2 is operated is maintained under pressure sufficient to insure complete phase conditions at the time of introduction into the column. The feed should also be introduced in a manner so as to be agitated with or mixed with furfural layer 4 as little as possible. No attempt is made to maintain layers 3 and 4 in equilibrium with each other.

Furfural descending through column 2 must pass through layer 3 and is there subjected to liquid-liquid extraction. To make liquid-liquid extraction effective either a considerable depth of hydrocarbon layer must be maintained or the descending furfural must be broken up into small streams. I prefer to use the relatively large overflow tray 5 for breaking up the furfural into small streams although any conventional device which given this result may be substituted for tray 5. Excellent results are obtained by maintaining the depth of hydrocarbon layer 3 at about 6 to 12 inches. Depths of 2 to 4 inches may be made effective by the use of suitable means for distributing the descending furfural in fine streams but such shallow depths offer mechanical difficulties with ordinary commercial equipment, such as insufficient depth to provide an adequate supply to a withdrawal line 11, etc.

Furfural from which foam producing impurities have been extracted is withdrawn from the bottom of column 2 via line 6 and is introduced as reflux into the top of column 7. As this furfural descends column 7 it is stripped of hydrocarbons not selectively absorbed. Furfural rich in selectively absorbed hydrocarbon is withdrawn via line 8 and is passed to a stripping column (not shown).

Overhead vapors from column 7 are withdrawn via line 9 and are introduced into a low point of column 2 at a point above the surface of liquid hydrocarbon layer 3, thus making columns 2 and 7, operated in series, equivalent to a single tall column. These vapors may, less preferably, be introduced above the lowest tray of column 2 if desired. They must be introduced at a sufficiently high point in column 2 to prevent agitation and mixing of liquid layers 3 and 4.

A portion of hydrocarbon layer 3 is continuously withdrawn via line 11 and is introduced into evaporator 12 which may be a fractionation column if such be required for efficient separation. Overhead vapors are withdrawn from evaporator via line 14, are condenser and recycled to the feed. A kettle product containing foam producing impurities is withdrawn via line 15 and discarded or passed to any further treatment or use desired.

The depth of hydrocarbon layer 3 may be maintained by controlling the rate of feed, the rate of withdrawal via line 11, the rate of heat transfer to layer 3, the temperature of the feed, the proportion of vaporization of the feed, the furfural temperature and the ratio of furfural to feed volume. The rate of withdrawal should be set at as low a value as is found to prevent foaming with the particular feed used and the depth of layer 3 controlled by controlling the rate of feed and the rate of heat transfer thereto. Withdrawal need not exceed about 10 per cent of the feed and may often be 5 per cent or less.

The process of the present invention is especially convenient when applied to the extractive distillation of mixtures of close boiling hydrocarbons of varying degrees of saturation. My invention is applicable to furfural extractive distillation processes for separating mixtures of acyclic, alicyclic and cyclic hydrocarbons, saturated and unsaturated or of varying degrees of saturation, the only limitation being that the selective solvent, furfural, absorbs or preferentially dissolves one or more of the desired components of the mixture. At the present time the principal commercial processes to which my invention is applicable are the separation of $C_4$ aliphatic hydrocarbons, and the purification of various napthenes, isoprenes, etc. by extractive distillation with furfural as selective solvent.

The process of the present invention is very convenient in operation. Merely changing the conditions of operation from conventional conditions will provide a hydrocarbon layer suitable for extracting foam producing polymer forming and/or polymerization accelerating impurities from the furfural. Its application is desirable whenever excessive polymer formation becomes excessive in furfural used in such processes or when excessive foaming occurs therein.

Example

In a furfural extractive distillation assembly of the type described above the absorber is a 12' column having 100 trays. Furfural containing dissolved water is introduced into an upper portion of this column at a rate of approximately 100,000 gallons per hour at a temperature of about 125° to 130° F. A hydrocarbon feed stream comprising 20 to 25 per cent $C_4$ olefins, principally butene-2, and 75 to 80 per cent butanes, principally normal butane, is introduced into a lower portion of the column at a temperature between 100° and 130° F. The column is maintained under a pressure of about 60 pounds per square inch gauge.

Under these conditions less than 20 per cent of the feed is volatilized. A layer of liquid hydrocarbon feed is formed and floats upon a layer of furfural in the bottom of the column. Furfural descending the column flows through the hydrocarbon layer and foam producing polymer forming and/or polymerization accelerating impurities are thereby extracted from the furfural.

Withdrawal of the hydrocarbon layer at a rate amounting to about 8 per cent of the feed is found to be sufficient to prevent undesirable accumulation of impurities in the furfural. The depth of hydrocarbon layer is maintained at between 6 and 12 inches by minor adjustments in the rate of flow of feed and by controlling the rate of heat transfer thereto. Under these conditions foam producing impurities do not accumulate in the furfural to an undesirable extent.

Having described my invention and explained its operation, I claim:

1. The improved process of extractive distillation of a mixture of hydrocarbons with furfural as selective solvent which comprises: introducing furfural in liquid phase into an upper portion of a fractionation column; passing such furfural downward through said column; concomitantly introducing a mixture of hydrocarbons in liquid phase into a lower portion of said column; vaporizing a portion of said mixture of said hydrocarbons, such portion being not more than 20 per cent of said mixture, passing resulting vapors upward through said column in direct contact with said furfural passed downward through said column and extracting and fractionating said resulting vapors; maintaining a layer of hydrocarbon liquid remaining from said vaporizing below the point of introduction of said mixture; passing furfural descending said column through said layer of hydrocarbon liquid; and withdrawing a hydrocarbon stream from said liquid hydrocarbon layer.

2. The improved process of extractive distillation of a mixture of hydrocarbons with furfural as selective solvent which comprises: introducing furfural in liquid phase into an upper portion of a fractionation column; passing such furfural downward through said column; concomitantly introducing a mixture of hydrocarbons in liquid phase into a lower portion of said column; vaporizing a portion of said mixture of said hydrocarbons, such portion being not more than 20 per cent of said mixture, passing resulting vapors upward through said column in direct contact with said furfural passed downward through said column and extracting and fractionating said resulting vapors; maintaining a layer of hydrocarbon liquid remaining from said vaporizing below the point of introduction of said mixture; passing furfural descending said column through said layer of hydrocarbon liquid; withdrawing a hydrocarbon stream from said liquid hydrocarbon layer; introducing said withdrawn hydrocarbon stream into distillation apparatus and distilling same therein; withdrawing a resulting kettle product containing impurities; and recycling a resulting overhead product from such distillation to said fractionation column.

3. The process of claim 2 wherein the mixture of low-boiling hydrocarbons is a mixture of paraffinic and unsaturated $C_4$ hydrocarbons.

4. The improved process of continuous extractive distillation of a mixture containing 20 to 25 per cent $C_4$ olefins, principally butene-2, and 75 to 80 per cent butanes, principally normal butane, with furfural as selective solvent which comprises: continuously introducing furfural at a temperature of about 125 to 130° F. in liquid phase into an upper portion of a fractionation column operating at a pressure of about 60 pounds per square inch gauge; continuously passing such furfural downward through said column; continuously concomitantly introducing said mixture of hydrocarbons in liquid phase into said column; continuously vaporizing a portion of said mixture of said hydrocarbons, such portion being not more than 20 per cent of said mixture, passing resulting vapors upward through said column in direct contact with said furfural passed downward through said column and extracting and fractionating said resulting vapors; continuously maintaining a layer of liquid hydrocarbons remaining from said vaporizing immediately below the point of introduction of said mixture; continuously passing furfural descending said column through said layer of liquid hydrocarbon; continuously withdrawing a hydrocarbon stream from said liquid hydrocarbon layer; continuously subjecting said withdrawn portion to distillation; continuously withdrawing from the last said distillation a resulting kettle product containing impurities; and continuously recycling a resulting overhead product from said distillation to the mixture of hydrocarbons introduced into said fractionation column.

5. A process for the separation of unsaturated $C_4$ hydrocarbons from more saturated $C_4$ hydrocarbons by extractive distillation in the presence of furfural, which comprises introducing a liquid $C_4$ hydrocarbon mixture containing such hydrocarbons as a liquid to a midpoint of a fractional distillation zone with conditions of temperature and pressure at said midpoint such that some but not more than 20 per cent of said liquid $C_4$ hydrocarbon mixture is vaporized, introducing a liquid furfural stream to the top of said fractional distillation zone, withdrawing hydrocarbon vapors from the top of said zone, withdrawing a liquid furfural stream containing dissolved unsaturated $C_4$ hydrocarbons from the bottom of said zone, maintaining an upper liquid hydrocarbon layer and a lower liquid furfural layer in contact with each other at said midpoint, and withdrawing from said distillation zone a portion of said liquid hydrocarbon layer containing impurities extracted from said liquid furfural layer.

6. In a process for the separation of unsaturated $C_4$ hydrocarbons from more saturated $C_4$ hydrocarbons by distilling a mixture containing said $C_4$ hydrocarbons in a fractional distillation zone in the presence of a descending stream of liquid furfural with recovery of more saturated $C_4$ hydrocarbons from the top of said distillation column as vapors and with recovery of unsaturated hydrocarbons dissolved in liquid furfural from the bottom of said distillation zone, the improvement which comprises removing impurities from said liquid furfural by maintaining in the middle of said distillation zone a liquid liquid contact zone comprising an upper liquid hydrocarbon zone and a lower liquid furfural zone, introducing a mixture of liquid C₄ hydrocarbons to be separated to said liquid hydrocarbon zone at a temperature and pressure such that some but not more than 20 per cent thereof is vaporized, passing resulting vapors upwardly in said distillation zone, passing liquid furfural which is descending in said distillation zone through said liquid contact zone, passing hydrocarbon vapors generated in the lower part of said fractional distillation zone to the upper part of said fractional distillation zone around said liquid liquid contact zone, and removing from said liquid hydrocarbon zone a portion of said liquid C₄ hydrocarbon mixture.

7. In a process for the separation of unsaturated hydrocarbons from more saturated hydrocarbons by distilling a mixture thereof in a fractional distillation zone in the presence of a descending stream of liquid furfural with a recovery of more saturated hydrocarbons from the top of said distillation column as vapors and with a recovery of unsaturated hydrocarbons dissolved in liquid furfural from the bottom of said distillation zone, the improvement which comprises removing impurities from said liquid furfural by maintaining in the middle of said distillation zone a liquid liquid contact zone comprising an upper liquid hydrocarbon zone and a lower liquid furfural zone, introducing a mixture of liquid hydrocarbons to be separated to said liquid hydrocarbon zone at a temperature and pressure such that some but not more than 20 per cent thereof is vaporized, passing resulting vapors upwardly in said distillation zone, passing liquid furfural which is descending in said distillation zone through said liquid contact zone, passing hydrocarbon vapors generated in the lower part of said fractional distillation zone to the upper part of said fractional distillation zone around said liquid liquid contact zone, and removing from said liquid hydrocarbon zone a portion of said liquid hydrocarbon mixture.

DOUGLAS S. SHERWIN.

REFERENCES CITED

The following references are of record in the file of this patent:

UNITED STATES PATENTS

| Number | Name | Date |
|---|---|---|
| 2,411,808 | Rupp et al. | Nov. 28, 1946 |
| 2,414,402 | Thodos et al. | Jan. 14, 1947 |